United States Patent [19]
Horvath

[11] 3,953,712
[45] Apr. 27, 1976

[54] MAGNETIC IDENTIFICATION APPARATUS

[75] Inventor: Stephen Horvath, St. Ives, Australia

[73] Assignee: Engineering Design & Development Pty. Ltd., Sydney, Australia

[22] Filed: Apr. 26, 1974

[21] Appl. No.: 464,412

[30] Foreign Application Priority Data
Nov. 9, 1973  Australia.......................... 53225/73

[52] U.S. Cl............................ 235/61.11 D; 360/88
[51] Int. Cl.² .................... G06K 7/08; G11B 15/42
[58] Field of Search ............... 235/61.11 D, 61.7 B, 235/61.12 M; 340/149 A; 200/46; 360/2, 88

[56] References Cited
UNITED STATES PATENTS

| | | | |
|---|---|---|---|
| 2,254,933 | 9/1941 | Bryce........................... | 235/61.11 D |
| 2,781,972 | 2/1957 | Chaimowicz................. | 235/61.11 D |
| 2,833,475 | 5/1958 | Dedek.......................... | 235/61.11 D |
| 3,154,761 | 10/1964 | O'Gorman..................... | 340/149 A |
| 3,274,352 | 9/1966 | Ryno et al. ............................ | 200/46 |
| 3,422,252 | 1/1969 | Cooper, Jr.................. | 235/61.11 D |
| 3,513,298 | 5/1970 | Riddle et al. ................ | 235/61.11 D |
| 3,531,627 | 9/1970 | Ham............................. | 235/61.12 M |
| 3,564,214 | 2/1971 | Cooper, Jr.................. | 235/61.11 D |
| 3,581,030 | 5/1971 | Sedley.......................... | 235/61.11 D |
| 3,651,312 | 3/1972 | Barney......................... | 235/61.12 M |
| 3,652,829 | 3/1972 | Hayakawi et al............ | 235/61.12 M |
| 3,862,399 | 1/1975 | Cain............................. | 340/174 PM |

Primary Examiner—Daryl W. Cook
Attorney, Agent, or Firm—Biebel, French & Nauman

[57] ABSTRACT

Magnetic identification apparatus is disclosed in which a magnetically coded instrument such as a key or card is inserted into a reader which reads the recorded code. The code is recorded by disposition of discrete magnets in the instrument as the instrument is inserted into the reader, the movement of the discrete magnets relative to sensor elements in the reader causes the sensor elements to be energized. The energization of certain sensor elements is an indication of the recorded code.

19 Claims, 9 Drawing Figures

FIG. 2.

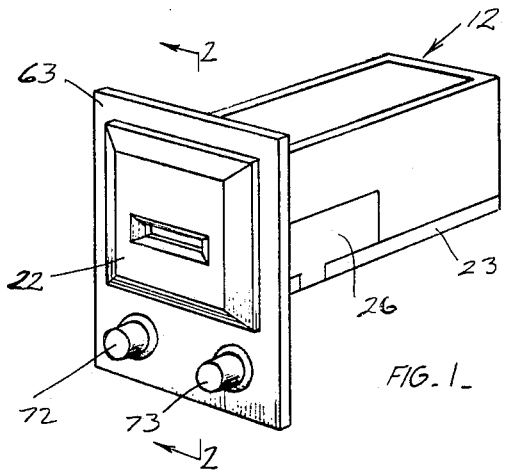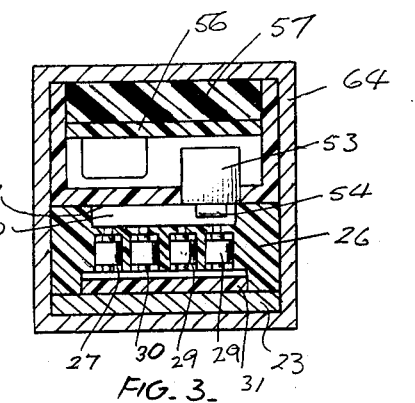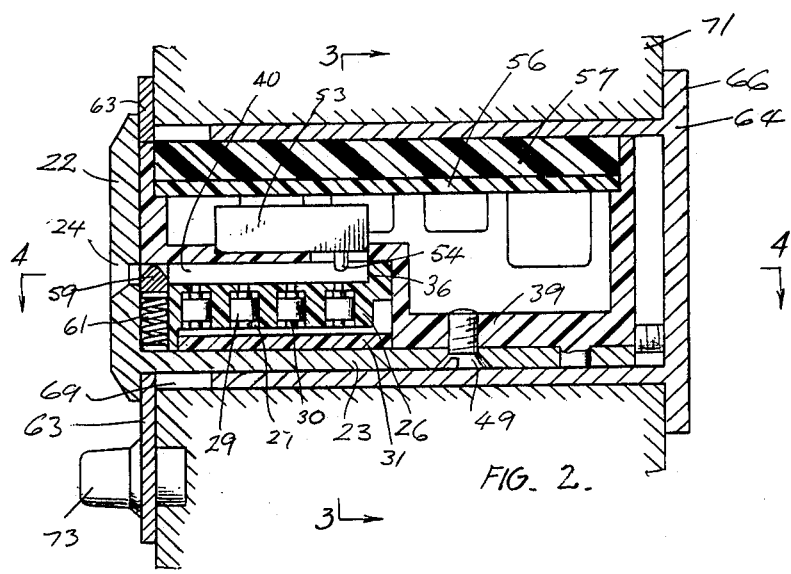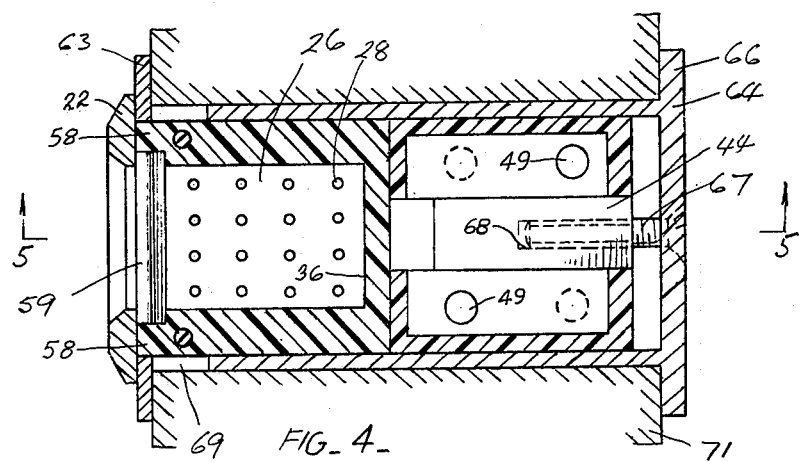

MAGNETIC IDENTIFICATION APPARATUS

BACKGROUND OF THE INVENTION

1. Field of the Invention

This invention relates to control systems in which an instrument such as a key or card having a code recorded on it is submitted to a reader which reads the recorded code. Such control systems may be used in magnetic locks, and various accounting and credit control facilities. In the case of a magnetic locking system, the reader would control the operation of a lock and the coded instrument would be in the form of a key which could be inserted into the reader. In the case of a credit control system, the instrument would usually be in the form of a coded card.

2. Description of Prior Art

There are various known control systems of the above general type, as typified by the systems disclosed in U.S. Pat. Nos. 3,508,031, 3,210,527 and 3,590,333. In the system shown in U.S. Pat. No. 3,508,031, a card having several copper discs is inserted into a card reader which has primary and secondary windings disposed to opposite sides of a card sensing area. The secondary windings are connected to silicon controlled rectifiers. On insertion of a card into the reader, a switch is closed to apply a pulse to the primary windings which then generate magnetic fields. In response to those magnetic fields that are not obstructed by copper discs in the card, the corresponding secondary windings generate output signals which trigger response rectifiers whereby the code recorded on the card is identified.

U.S. Pat. No. 3,210,527 also describes an apparatus in which the reader has primary and secondary coils. The primary coils are energised to produce magnetic fields which are modified by the coded instrument to produce signals in the secondary windings whereby the coded information is sensed.

In the system described in U.S. Pat. No. 3,509,333, a card reading station includes a reading head which sweeps across a coded card in order to generate a sequence of electric impulses representative of the code recorded on the card.

SUMMARY OF THE INVENTION

In accordance with the present invention, magnetic identification apparatus is provided in which a code is recorded on an instrument by the disposition of discrete magnetized portions of the instrument and in which the reader senses the recorded code by generation of electromotive force in one or more sensor elements. The sensor elements are energized by movement of the magnetized portions of the instrument relative to the sensor elements as the instrument is applied to the reader. This arrangement enables a code to be read almost instantaneously as in the case of the systems described in U.S. Pat. Nos. 3,508,031 and 3,210,527. However, it eliminates the need for the provision of both primary and secondary coils and, more importantly, it results in an arrangement in which the sensor coils are normally dead and are not subjected to a voltage other than that induced by a correctly coded instrument, so leading to better security.

In accordance with the present invention, there is provided magnetic identification apparatus comprising a magnetically coded instrument including discrete magnetized portions, the disposition of which determines the magnetic code of the instrument, and a reader to which to apply the instrument, the reader comprising a body defining a guideway for the instrument;

sensor elements mounted on the body adjacent the guideway to register with the magnetized portions of the instrument when the instrument is moved along the guideway such that movement of the magnetic portions of the instrument relative to the sensor coils induces an electromotive force in each of the sensor coils;

electric output means which is conditioned by the induced electromotive force to provide an output signal.

In order that the invention may be more fully explained one particular embodiment will now be described in detail with reference to the accompanying drawings.

BRIEF DESCRIPTION OF THE DRAWINGS

FIG. 1 is a perspective view of a reader to read magnetically coded keys;

FIG. 2 is a sectional view on the line 2—2 in FIG. 1;

FIG. 3 is a sectional view on the line 3—3 in FIG. 2;

FIG. 4 is a sectional view on the line 4—4 in FIG. 2;

DESCRIPTION OF PREFERRED EMBODIMENT

The illustrated system makes use of an instrument 11 in the shape of a key which is fitted with a number of magnets at selected positions in a matrix of possible positions. There may, as illustrated, be sixteen possible positions disposed in a 4 × 4 matrix. The key is inserted into a reader head 12 fitted with a number of sensor coils wherein signals are generated by the movement of the magnets. These signals may be used to initiate various functions depending on the particular application of the system. In the system to be described, they trigger a relay circuit which causes actuation of a solenoid which may be caused to operate a lock. Correct and effective output signals are generated only by the insertion of a key with magnets in the correct locations.

Figure 6:
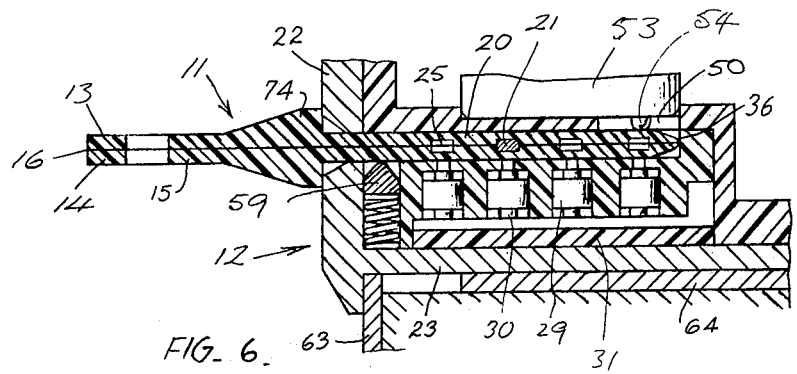
FIG. 6 is a partial sectional view of the reader as shown in FIG. 2 with a magnetically coded key inserted.
Figure 7:
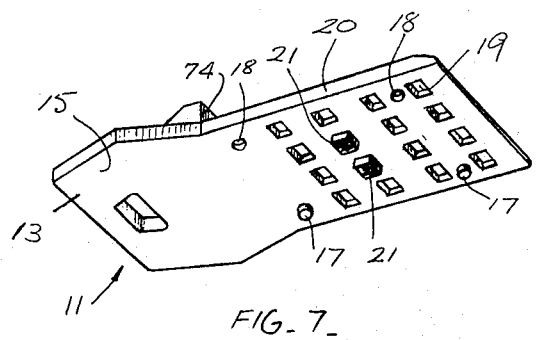
FIG. 7 is a perspective view of part of the key.

As seen in FIGS. 6 and 7, instrument 11 is comprised of a pair of body portions 13-14 which fit together at a flat interface 16 to form a key shaped body having a head 15 and a rectangular flat plate part 20. The two body portions are identical. They are moulded from tough, nonmagnetic plastics material such as glass fiber reinforced nylon and have interengaging pegs 17 and holes 18 at the interface 16. At this interface, they are also each provided with sixteen recesses 19 arranged in a 4 × 4 matrix so that when the two body portions are fitted together sixteen closed pockets 25 are formed within the key. The key is coded by the inclusion of small permanent magnets 21 within selected pockets of the matrix.

Magnets 21 may be formed as small discs or cylinders of permanently magnetised metal, i.e. they may be unisotropic magnets. It would, however, be possible to install isotropic magnets which would loose their magnetism after a set period, so enabling the issue of keys which would be effective for a limited period only. The key is coded according to the number and disposition of magnets 21 in the matrix of sixteen pockets. It will be appreciated that since there are sixteen positions available for installation of magnets and the polarity of the magnets may be reversed simply by physical inversion, the number of possible code combinations is very large indeed.

Reader 12 comprises a front plate 22 formed integrally with a base plate 23. Front plate 22 has a slot 24 through which to insert the magnetically coded front plate part 20 of key 11, and base plate 23 supports a sensor block 26 immediately behind the face plate. Sensor block 26 has sixteen cylindrical cavities 27 formed in its underside and joining with sixteen smaller diameter holes 28 extending through to the upper face of the sensor block. Cavities 27 and holes 28 are disposed in a 4 × 4 matrix at the same spacing as the matrix of the magnetically coded key so that when plate part 20 of the key is inserted through slot 24 in face plate 22, the sixteen key pockets 25 will come into registration with the sixteen holes 28 and cavities 27 of the sensor block. Selected cavities 27 are fitted with sensor coils 29 which are wound on carbide core rods 30 electrically connected to a printed circuit on a fiber glass board 31 beneath the sensor block. The operation of the sensor coils and the printed circuit of board 31 will be described below.

Figure 8:
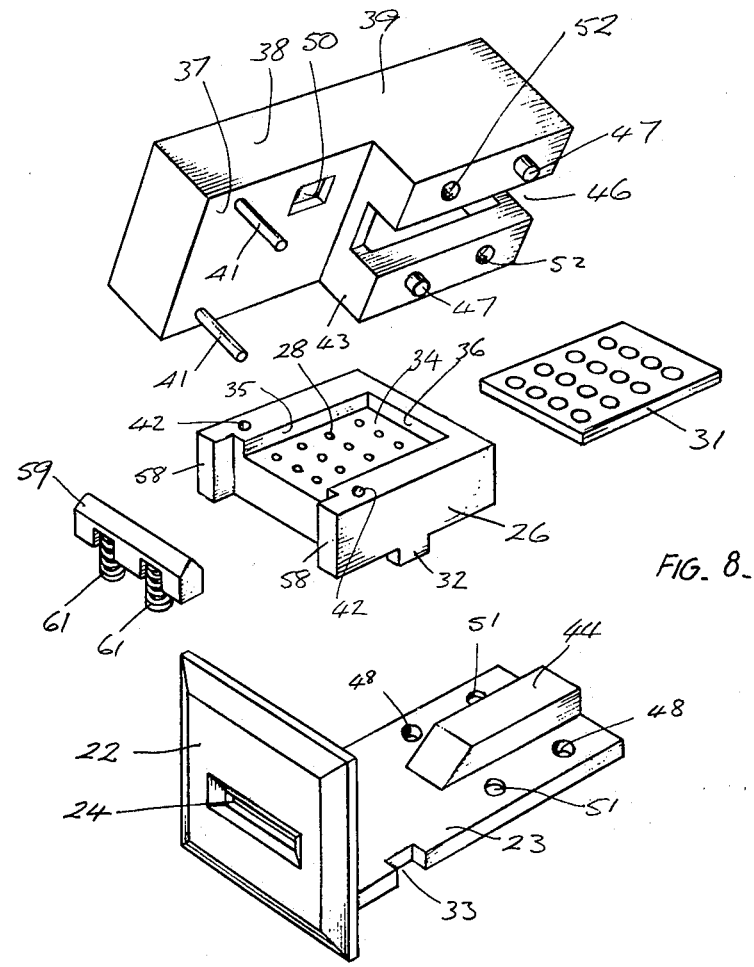
FIG. 8 is an exploded perspective view of various components of the reader.

As best seen in FIG. 8, the underside of sensor block 26 has downwardly depending lugs 32 which fit into notches 33 in the edges of base plate 23 to provide positive location of the sensor block. The upper face of the sensor block has a large rectangular recess to provide a floor 34, side walls 35 and inner end wall 36 of a slideway 40 to receive the plate part 20 of key 11. Slideway 40 is in the form of a flat rectangular cavity which is completed by a roof 37 defined by the underside of a front part 38 of a housing 39.

The front part 38 of housing 39 fits over sensing block 26 and has downwardly extending pegs 41 which fit into vertical holes 42 in the sensor block. Housing 39 is stepped at 43 and its back part rests on base plate 23. The rear part of base plate 23 has a central block 44 which fits into a slot 46 in the underside of the rear part of housing 39. Block 44 is connected to the housing by interengaging pegs 47 and holes 48 and by mounting screws 49 which extend upwardly through holes 51 in the base plate into tapped holes 52 in the housing.

As shown in FIGS. 2 and 3, a micro switch 53 is mounted in the front part of housing 39 so that its actuator element 54 extends downwardly through an aperture 50 in the underside of the housing to project into slideway 40 adjacent its rear wall 36. The upper end of housing 39 is closed by a board 56 which carries various electrical components of the reader circuit to be described below with reference to the circuit diagram. The housing is sealed by a layer of epoxy resin 57 poured over plate 56 on assembly of the reader.

Figure 5:
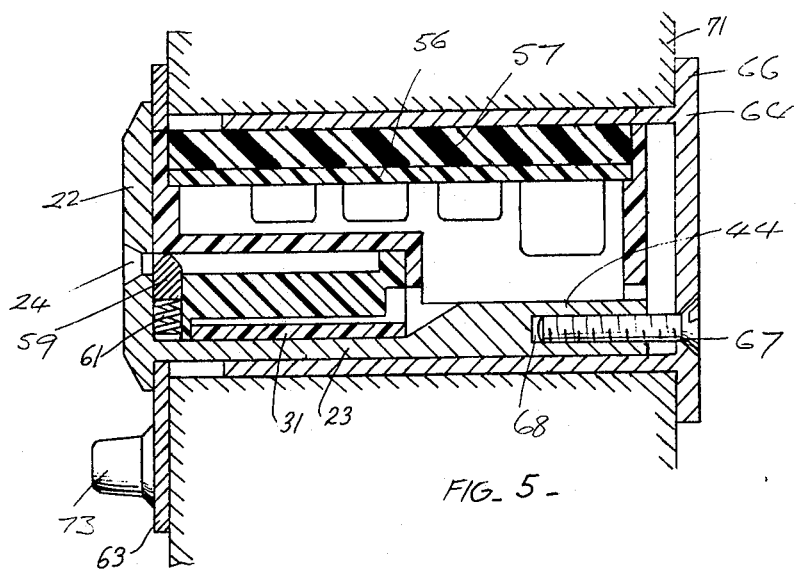
FIG. 5 is a sectional view on the line 5—5 in FIG. 4.

As shown in FIGS. 4 and 5, the front end of sensor block 26 has forwardly projecting side wings 58 which engage the back of front plate 22 to define a slot for vertical sliding movement of a slideway barrier member 59. Member 59 is normally biased upwardly by a pair of springs 61 against the roof 37 of the slideway so as to block the slideway entrance. The upper edge of member 59 is chamfered to a knife edge, and the front end of key 11 is similarly chamfered so that on insertion of the key, barrier 59 will be wedged downwardly and will not impede entry of the key into the slideway. Member 59 does, however, provide an effective seal against entry of dust or other foreign material when the key is withdrawn.

The assembly of the reader is completed by an escutcheon plate 63 which backs front plate 22 and by an outer housing 64 which includes a back plate portion 66. A clamping screw 67 is extended through the back plate portion 66 of housing 64 and into a tapped hole 68 in the block 44 on base plate 23. The reader may be installed in a cavity 69 extending through a mounting structure 71. In the case of a magnetic lock system, mounting structure 71 may be a building wall adjacent a door way, and the escutcheon plate 63 may be fitted with indicator lights 72 and 73, such as shown in FIG. 1, connected to the electric circuit of the reader to indicate the condition of the lock.

In operation of the illustrated apparatus, the magnetically coded front plate part 20 of key 11 is simply inserted through slot 24 into slideway 30. Until the front edge of the key approaches the rear end of the slideway, the sensing circuit of the reader is completely inoperative. However, when the front edge of the key approches the rear wall 36 of the slideway, it engages the actuator member 54 of micro-switch 53 so as to energize the sensor sensing circuit. If the magnets 21 of the key are in proper registration with the sensing coils of the reader, the final movement of the magnets from the point at which the micro-switch is actuated to the limit of key insertion will induce an e.m.f. in the respective sensor coils and the electric circuit of the reader will then be conditioned to provide an output signal.

The forward part of the key head portion 15 is thickened to produce forwardly facing shoulders 74 which engage the front plate 22 of the reader to limit forward movement of the key. One or more of the sensor coils in sensor block 26 may be connected into an electric circuit to serve as an inhibiting sensor such that, if a magnet is moved across it to induce an e.m.f. therein, the generation of an output signal will be prevented no matter what signals may be produced by the other sensor coils.

Figure 9:
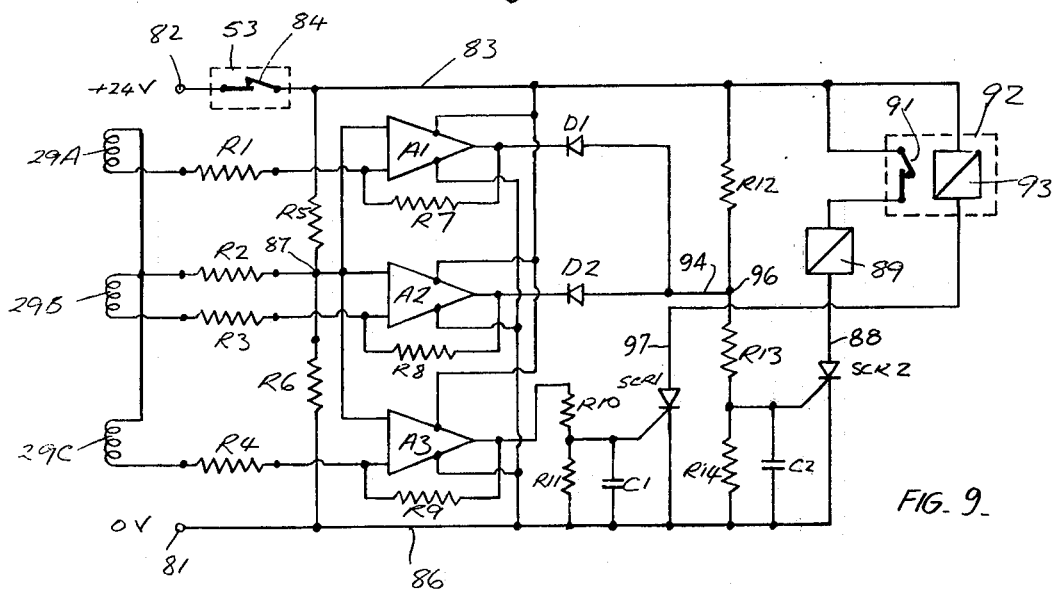
FIG. 9 is a diagram of the electrical circuit of the reader.

An exemplary circuit is illustrated in FIG. 9, which shows three sensor coils 29A, 29B and 29C. Coils 29A and 29B are connected into the circuit to provide an output signal when activated and coil 29C is connected into the circuit to serve as an inhibitor. The circuit receives a 24 volt DC supply between a ground terminal 81 and terminal 82. This supply may be provided through a transformer and fullwave rectifier with a filter capacitor, or it may be provided by a battery. Line 83 receives 24 volts via the contacts 84 of micro-switch 53, and line 86 is held at zero volts.

Sensor coils 29A, 29B and 29C have common sides connected via a resister R2 to a junction 87 between a pair of voltage dividing resistors R5 and R6. Resistors R5 and R6 are connected to lines 83 and 86 to hold junction 87 at a voltage between 24 volts and zero volts. Signals induced in coils 29A and 29B are fed via resistors R1 and R3 to the non-inverting inputs of respective operational amplifiers A1 and A2 the outputs of which are fed to the cathodes of diodes D1 and D2. Amplifier A1 has a feed back resistor R7 and the gain of this amplifier is therefore set to the ratio of R1:R7. Similarly amplifier A2 has a feed back resistor and its gain is thus the ratio of R3:R8.

A silicon controlled rectifier SCR2 is connected in a line 88 which extends between lines 83 and 86. Line 88 includes a solenoid 89 and normally closed contacts 91 of a magnetic relay 92 having a solenoid 93 operable to open contacts 91. A resistor R14 and capacitor C2 are connected between the control electrode or gate of rectifier SCR2 and line 86. Capacitor C2 serves as a filter and resistor R14 controls inrush current. The anodes of diodes D1 and D2 are connected to a common line 94 extending to junction 96 between a pair of resistors R12 and R13 which are connected in series between line 83 and the gate of silicon controlled rectifier SCR2. The gate voltage of rectifier SCR2 is applied to junction 96 via resistor R13, and a positive voltage is applied to junction 96 from line 83 via resistor R12 to produce a net balance voltage at junction 96 which is also determined by the condition of diodes D1, D2. The arrangement is such that, although diodes D1, D2 cannot pass positive signals through the line 94 they can be conditioned by outputs from amplifiers A1 and A2 to upset the voltage balance at junction 96 to trigger rectifier SCR2. The interconnection of diodes D1 and D2 provides an AND gate requiring that signals be generated simultaneously in coils 29A and 29B to upset the voltage balance at junction 96 so as to trigger rectifier SCR2. When the rectifier is triggered, current flows in line 88 to ground and it is this current which represents the output signal of the circuit. In the illustrated circuit, the output signal energises solenoid 89 which may, for example move the bolt of a deadlock.

Coil 29C is connected to inhibiting circuitary which includes an operational amplifier A3. Resistors R4 and R9 determine the gain of amplifier A3 and this gain is set to be greater than the gain of amplifiers A1 and A2. The output side of amplifier A3 is connected via a resistor R10 directly to the control electrode or gate of a silicon controlled rectifier SCR1. This gate electrode is also connected to line 86 via a filter capacitor C1 and an inrush current control resistor R11. Rectifier SCR1 is connected in a line 97 which extends between line 83 and 86 and includes the inhibitor solenoid 93. Provided that no signal is generated in coil 29C, no current will flow in line 97 and relay contacts 91 will remain closed. However, if a signal is induced in coil 29C, it is amplified by amplifiers A3 and fed directly through the small control resistance R10 to the gate of rectifier SCR1, triggering that rectifier and causing operation of solenoid 93. Contacts 91 then open to break the conductive path through the main solenoid 89 and rectifier SCR2. Solenoid 89 therefore cannot be operated regardless of what signals are thereafter induced in coils 29A and 29B.

Since the gain of amplifier A3 is much greater than the gain of amplifiers A1 and A2, and the output of this amplifier is fed directly to the gate of rectifier SCR1 rather than through a diode as in the case of amplifiers A1 and A2, rectifier SCR1 will be triggered by a signal in coil 29C well before rectifier SCR2 can be triggered by signals generated in coils 29A, 29B. Thus, for example, if a magnetized plate is pushed into the reader to activate all of the sensor coils simultaneously, the inhibiting circuitary will operate before an output signal can be generated.

Although the exemplary circuit in FIG. 9 shows three sensor coils, this number can obviously be varied to provide a large number of possible combinations and to provide more inhibiting positions. In addition to separate inhibitor coils, the active sensor coils could be interconnected to provide some inhibiting action. For example, two sensor coils could be connected in parallel to the input side of each of the sensor amplifiers A1 and A2 such that both must generate a positive signal to activate the amplifiers. If one of the coils generates a negative signal, or no signal at all, the respective rectifier will not be triggered. This can be achieved for example by having one right hand coil and one left hand coil connected in parallel.

It was mentioned above that sensor coils 29 are connected to printed circuit board 31. This carries a printed "logic" circuit of conventional type to determine the correct combination number and its terminals are connected to the various electrical components of the circuit which are mounted in the housing 39. This provides a compact arrangement and the whole reader head can be produced quite cheaply.

The illustrated apparatus differs from prior art arrangements essentially in that all the sensor coils are dead and have signals induced in them by movement of the key magnets across them. The sensing circuit is not energised until micro switch-53 is activated and the 4 × 4 matrix of key pockets 25 is substantially in registration with the 4 × 4 matrix of the sensor block 26 so that any voltages induced in the sensor coils before the two matrixes are in registration cannot produce spurious output signals. Because the sensor coils cannot be activated except by the movement of magnets at correct locations, their positions cannot be determined even by sophisticated sensing equipment. Since the coils may be either left or right hand and the key magnets may be inverted, the number of combinations is greatly increased by the possibility of reversing polarity at each location, and even greater security is achieved in that even if the correct coil locations could be determined, the correct combination of polarities would also need to be known. The use of signals induced directly by the movement of key magnets also results in simplification of the reader head since it is not necessary to provide primary and secondary windings or means to generate strong magnet fields within the reader head. The system also readily permits binary coding of the key and reader.

In many cases it will be desirable to distribute the key magnets so that the key can be inserted into the reader either way up. To achieve this end the magnets must be arranged symmetrically about a center line extending along the key with the polarity of each magnet on one side of the center line opposite of the polarity of the magnets on the other side of the center line. In a security system for a building or establishment involving several doors, at least some of the readers may have circuits to provide an output signal in response to more than one key combination to allow for the issue of master and sub-master keys.

The illustrated apparatus has been advanced by way of example only and many modifications may be made to it depending on the degree of security required and the particular application of the apparatus. It is accordingly to be understood that the invention is in no way limited to the details of this apparatus and that many modifications and variations will fall within the spirit and scope of the appended claims.

I claim:

1. Magnetic identification apparatus comprising a magnetically coded instrument including a plurality of discrete magnetized portions, the disposition of which determines the magnetic code of the instrument, and a reader to which to apply said instrument, said reader comprising a body defining a guideway for said instrument, a plurality of sensor elements mounted on the body adjacent the guideway to register with said magnetized portions of the instrument when the instrument is moved along the guideway such that movement of said magnetized portions of the instrument relative to the sensor coils induces an electromotive force in each of said sensor coils, a controlled rectifier having a control electrode, a plurality of amplifiers connected one to each of said sensor elements to amplify the signals induced in those elements, a plurality of diodes via which the outputs of said amplifiers are connected to said control electrode forming an AND gate so that all of said amplifiers must produce output signals simultaneously to change the state of conduction of said controlled rectifier, at least one further sensor element mounted on said body adjacent said guideway such that movement of a magnet in said guideway adjacent said further sensor element will induce an electromotive force therein, relay means to break a conduction path through said controlled rectifier, a further controlled rectifier having a control electrode and connected to said relay means such that the condition of said relay means is dependent on the state of conduction of that further controlled rectifier, and a further amplifier connected between said further sensor element and said control electrode of said further controlled rectifier so that an electromotive force induced in said further sensor element is amplified and an output from said further amplifier changes the state of condition of said further controlled rectifier.

2. Magnetic identification apparatus as clamed in claim 1, wherein said further amplifier has a greater gain than any of said plurality of amplifiers.

3. Magnetic identification apparatus as claimed in claim 1, wherein said further sensor element is one of a plurality of similar sensor elements and said further amplifier is one of a like plurality of further amplifiers connected one to each of the further sensor elements, the output sides of said amplifiers all being connected to the control electrode of said further controlled rectifier so that an output signal from any one of said further amplifiers changes the state of conduction of said further controlled rectifier.

4. Magnetic identification apparatus comprising:

a magnetically coded instrument including a plurality of discrete magnets embedded in a non-magnetic material, the position of said magnets determining the magnetic code of said instrument; and a reader to which to apply said magnetically coded instrument comprising:

a body defining a guideway for said instrument, and a plurality of sensor means, for sensing said discrete magnets, mounted on said body adjacent said guideway in such a position that each of said sensor means may register with an associated one of said plurality of discrete magnets when said magnetically coded instrument is applied to said reader, each of said plurality of sensor means comprising a helically wound sensor coil positioned transverse to said guideway, said sensor coils providing an output signal when one of said discrete magnets is moved past said sensor coil.

5. The magnetic identification apparatus of claim 4 further comprising electrical output means, responsive to said plurality of sensor means, for providing an output signal when appropriate ones of said sensor coils provide output signals.

6. Magnetic identification apparatus as claimed in claim 5, wherein said instrument has a flat plate part in which are embedded said discrete magnets, the guideway is a flat cavity slidably to receive said flat plate part of said instrument and said sensor coils are disposed to one side of the cavity.

7. Magnetic identification apparatus as claimed in claim 5, wherein said reader further includes switch means normally rendering said output means inoperative but responsive to movement of said instrument along said guideway to render said output means operative when said instrument approaches a predetermined position in said guideway.

8. Magnetic identification apparatus as claimed in claim 5, wherein the electrical output means includes a controlled rectifier having a control electrode and wherein each sensor coil is connected to an amplifier to amplify the signal induced in that sensor coil, the output of each amplifier being connected to the control electrode such that an output signal from each amplifier changes the state of conduction of the controlled rectifier.

9. Magnetic identification apparatus as claimed in claim 7, wherein the electrical output means includes a controlled rectifier having a control electrode and wherein each sensor coil is connected to one of a plurality of amplifiers to amplify the signal induced in its associated sensor coil, the output of each of said amplifiers connected to the control electrode of the controlled rectifier via respective diodes providing an AND gate, such that all amplifiers must produce output signals simultaneously to change the state of conduction of the controlled rectifier.

10. Magnetic identification apparatus as claimed in claim 5, wherein said reader has at least one further sensor means adjacent said guideway such that movement of a permanent magnet in said guideway adjacent said further sensor element will induce an electromotive force therein and inhibitor means, connected to said further sensor means and to said electrical output means, to be operative in response to an induced electromotive force in the said further sensor element to prevent said output means from providing an output signal.

11. Magnetic identification apparatus as claimed in claim 10, wherein said inhibitor means comprises: relay means to break a conduction path in said output means, a controlled rectifier device having a control electrode and connected to said relay means such that the conduction of said relay means is dependent on the state of conduction of said controlled rectifier device, and amplifier means, connected between said further sensor means and said control electrode of said controlled rectifier device, so that a signal induced in said further sensor means is amplified and an output signal from said amplifier means changes the state of conduction of said controlled rectifier device.

12. Magnetic identification apparatus comprising:

a magnetically coded instrument having a plurality of discrete magnetized portions, the disposition of which determines the magnetic code of the instrument; and a reader to which to apply said magnetically coded instrument comprising:

a body defining a guideway for said instrument;

a plurality of sensor means for sensing said discrete magnetized portions of said instrument and mounted on said body adjacent said guideway in such positions that when said instrument reaches a predetermined position in the guideway each of said sensor means may register with an associated one of said plurality of discrete magnetized portions and have an electromotive force induced therein by movement of the associated one of said plurality of discrete magnetized portions consequent to further movement of said instrument along said guideway;

electric output means, responsive to said plurality of sensor means, for providing an output signal when appropriate ones of said sensor means simultaneously provide output signals; and switch means normally rendering said output means inoperative but responsive to movement of said instrument along said guideway to render said output means operative when said instrument reaches said predetermined position in said guideway.

13. Magnetic identification apparatus as claimed in claim 12, wherein each of said plurality of sensor means comprises a helically wound sensor coil positioned transverse to said guideway.

14. Magnetic identification apparatus as claimed in claim 12, wherein said instrument has a flat plate part which carries said magnetized portions, said guideway is a flat cavity slidably to receive said flat plate part of said instrument and said sensor means are disposed to one side of said cavity.

15. Magnetic identification apparatus as claimed in claim 12, wherein said electrical output means includes a controlled rectifier having a control electrode and a plurality of amplifiers, and wherein each said sensor means is connected to an associated one of said plurality of amplifiers to amplify the signal induced in said sensor means, and the outputs of said plurality of amplifiers are connected to said control electrode such that output signals from the amplifiers change the state of conduction of the controlled rectifier.

16. Magnetic identification apparatus as claimed in claim 15, wherein the outputs of said plurality of amplifiers are connected to the control electrode of the controlled rectifier via respective diodes providing an AND gate, such that all amplifiers must produce output signals simultaneously to change said state of conduction of said controlled rectifier.

17. Magnetic identification apparatus as claimed in claim 16, wherein said reader has at least one further sensor means adjacent said guideway such that movement of a magnet in said guideway adjacent said further sensor element will induce an electromotive force therein and inhibitor means, connected to said further sensor means and to said electrical output means, to be operative in response to an induced electromotive force in the said further sensor means to prevent said output means from providing an output signal.

18. Magnetic identification apparatus comprising:

a magnetically coded instrument having a plurality of discrete magnetized portions, the disposition of which determines the magnetic code of the instrument; and a reader to which to apply said magnetically coded instrument comprising:

a body defining a guideway for the instrument;

a plurality of sensor means, for sensing said discrete magnetized portions of said instrument and mounted on said body adjacent said guideway in such positions that when said instrument reaches a predetermined position in said guideway, each of said sensor means may register with an associated one of said plurality of discrete magnetized portions and have an electromotive force induced therein by movement of the associated one of said plurality of discrete magnetized portions consequent to further movement of said instrument along the guideway; and electric output means, responsive to said plurality of sensor means, for providing an output signal when appropriate ones of said sensor means simultaneously provide output signals;

wherein said instrument has a flat plate part which carries said magnetized portions, the guideway is a flat cavity slidably to receive said flat plate part of said instrument and said sensor means are disposed to one side of the cavity.

19. Magnetic identification apparatus as claimed in claim 18, wherein the electrical output means includes a controlled rectifier having a control electrode and wherein each said sensor means is connected to an associated one of a plurality of amplifiers to amplify the signal induced in said sensor means and the outputs of said plurality of amplifiers are connected to said control electrode such that output signals from the amplifiers change the state of conduction of said controlled rectifier.

* * * * *

UNITED STATES PATENT AND TRADEMARK OFFICE
CERTIFICATE OF CORRECTION

PATENT NO. : 3,953,712
DATED : April 27, 1976
INVENTOR(S) : Stephen Horvath

It is certified that error appears in the above-identified patent and that said Letters Patent are hereby corrected as shown below:

On the cover page, under item 30, in place of "Nov. 9, 1973 - Australian 53225/73" substitute --February 14, 1974 Australian 65612/74--.

Signed and Sealed this

Seventh Day of September 1976

[SEAL]

Attest:

RUTH C. MASON
*Attesting Officer*

C. MARSHALL DANN
*Commissioner of Patents and Trademarks*